United States Patent [19]

Gadkaree et al.

[11] Patent Number: 5,488,023
[45] Date of Patent: Jan. 30, 1996

[54] METHOD OF MAKING ACTIVATED CARBON HAVING DISPERSED CATALYST

[75] Inventors: Kishor P. Gadkaree, Big Flats; Mallanagouda D. Patil; Steven B. Dawes, both of Corning, all of N.Y.

[73] Assignee: Corning Incorporated, Corning, N.Y.

[21] Appl. No.: 289,434

[22] Filed: Aug. 12, 1994

[51] Int. Cl.$^6$ ............................................. B01J 21/18
[52] U.S. Cl. .................. 502/182; 502/183; 502/184; 502/185; 502/402; 502/410; 502/411; 502/418; 502/423; 502/427; 502/439
[58] Field of Search .................... 502/174, 182, 502/183, 184, 185, 402, 410, 411, 418, 423, 427, 439

[56] References Cited

U.S. PATENT DOCUMENTS

| | | | |
|---|---|---|---|
| 3,793,224 | 2/1974 | Cooper | 252/423 |
| 3,885,977 | 5/1975 | Lachman et al. | 106/62 |
| 3,886,093 | 5/1975 | Dimitri | 252/447 |
| 4,127,691 | 11/1978 | Frost | 428/116 |
| 4,482,641 | 11/1984 | Wennerberg | 502/182 |
| 4,758,272 | 7/1988 | Pierotti et al. | 75/246 |
| 4,892,857 | 1/1990 | Tennent et al. | 502/439 |
| 4,970,189 | 12/1990 | Tachibana | 502/183 |
| 4,992,233 | 2/1991 | Swaroop et al. | 419/2 |
| 5,037,791 | 8/1991 | Comolli et al. | 502/185 |

FOREIGN PATENT DOCUMENTS

0488716A1  11/1991  European Pat. Off. .

*Primary Examiner*—Asok Pal
*Assistant Examiner*—Timothy H. Meeks
*Attorney, Agent, or Firm*—L. Rita Quatrini

[57] ABSTRACT

A method for making an activated carbon supported catalyst, the method comprising combining a carbon precursor and a catalyst precursor, curing the carbon precursor if necessary, carbonizing the carbon precursor, and activating the carbon to produce the activated carbon supported catalyst. The activated carbon supported catalyst can take the form of a coating on a substrate, a powder, or a monolithic body.

22 Claims, No Drawings

1

METHOD OF MAKING ACTIVATED CARBON HAVING DISPERSED CATALYST

This application relates to a method of making a catalyst uniformly dispersed on an activated carbon support. Preferably a catalyst metal precursor is combined with an activated carbon precursor which is then applied as a coating to a substrate, after which the activated carbon precursor is carbonized, and activated to form a durable activated carbon coating having the catalyst dispersed thereon.

BACKGROUND OF THE INVENTION

Metals such as transition metals, including noble and base metals are used as catalysts in many chemical reactions. Catalysts generally increase the rate of chemical reaction which results in higher production rate in industry. Some catalysts are also used to drive reactions along a desired path, i.e., the catalysts make formation of certain chemicals energetically favorable over other chemicals.

In general, catalysts are expensive, and hence it is necessary to utilize a given amount of catalyst to its maximum potential. This is done by maximizing the catalyst surface area, i.e., by increasing its dispersion. Catalysts can be used as solids or liquids. The solid catalysts, although they can be used as powders, are generally supported on high surface area supports. The properties of the support become very important in such cases.

Activated carbon has also been used as a support for catalyst metals, e.g., noble metals because of its very high surface area. Such catalysts are used (powder or beads form) in various petrochemical reactions. These catalysts are normally made by dispersing noble metal particulates on preformed activated carbon (incipient wetness technique).

The incipient wetness technique involves dispersing the activated carbon powders in a solution of a metal salt. The activated carbon powder is then impregnated with the solution. The powder is filtered out, dried, and heated to appropriate temperature to decompose the salt to the desired metal or metal oxide catalyst. Multiple impregnations are usually required to obtain the desired quantity of catalyst on the activated carbon. Surface properties of activated carbon powders play a very important part in the dispersion of the metal catalyst obtained. Oxygen content and surface pH of the carbon powder has to be carefully controlled to obtain a good dispersion of the metal on the activated carbon. The various steps which are involved in this process result in a very expensive activated carbon supported catalyst powder.

Another technique for making activated carbon supported catalysts involves depositing a catalyst metal precursor with high vapor pressure onto a carbon surface. In this technique the carbon surface chemistry affects the choice of catalyst precursors. Often the appropriate precursors are not available for many of the most desirable catalysts. Examples of catalyst metals that cannot be readily vapor deposited are alkaline earths, Cr, Mn, Cu, etc. since compounds of these metals have low vapor pressures. Other metals such as Pt, Pd, and Co are difficult because the volatile compounds of these metals decompose rapidly in the vapor phase. Furthermore, many of those that are available are highly toxic. Finally the method requires highly developed, expensive deposition equipment.

Hence, it would be an advancement in the art to have a simpler and more cost effective method of making an activated carbon catalyst having a catalyst uniformly dispersed thereon.

The present invention provides such a method.

SUMMARY OF THE INVENTION

In accordance with one aspect of the invention, there is provided a method for making an activated carbon supported catalyst, which involves combining a carbon precursor and a catalyst precursor, curing the carbon precursor if necessary, carbonizing the carbon precursor, and activating the carbon to produce the activated carbon supported catalyst.

In accordance with another embodiment, the activated carbon supported catalyst can take the form of a coating on a substrate, a powder, or a monolithic body.

DETAILED DESCRIPTION OF THE INVENTION

The present invention provides a method of making an activated carbon catalyst having a catalyst distributed uniformly on the activated carbon particles. The invention also provides an activated carbon catalyst support in the honeycomb form. The advantage of the honeycomb substrate is that it provides a ready-made reactor for continuous flow reactions. The honeycomb catalytic reactor can also be fitted with electrodes and heated to provide a controlled temperature for a given reaction.

Generally, the method involves contacting a catalyst precursor with a precursor of activated carbon, and thereafter carbonizing the precursor and activating the carbon. The catalyst is said to be applied during the "in-situ" formation of the activated carbon.

This in-situ method offers a number of advantages over methods of preparing more standard carbon supported catalysts. For example, the catalyst is highly dispersed metal on highly porous activated carbon and this is done in only one step, i.e. contacting the catalyst precursor initially with the activated carbon precursor. The in-situ process of the present invention is more cost effective than prior methods because the step or steps of loading the carbon with the catalyst is eliminated.

The activated carbon and catalyst can be in the form of fine powder granules, pellets or monolithic body. The carbon can be coated onto inorganic particles, flakes, platelets such as clay, mica, or any other inorganic powdered materials or inorganic fibers, such as alumina, mullite, glass, glass ceramics, SiC, $Si_3N_4$ etc. The carbon can be coated onto a formed substrate such as tubes, foams, multicellular bodies. The preferred shape of carbon monoliths and carbon coated substrates is a multicellular structure such as a honeycomb.

The catalyst is chosen to fit the desired application, e.g., oil refinement, chemical synthesis, pollution abatement as automotive exhaust purification, etc.

The catalyst precursor is most typically a compound e.g. organic or inorganic salt of a catalyst metal which decomposes to the catalyst metal or catalyst metal oxide on heating. Inorganic compounds can be e.g., oxides, salts such as chlorides, nitrates, carbonates, sulphates, complex ammonium salts, etc. Organic compounds can be e.g., organometallic halides of the appropriate type.

Typical catalyst metals are transition metal, alkali metal, alkaline earth, or combinations of these. Most useful are the noble metals, base metals or any combination of these. Advantageously the catalyst metals are Pt, Pd, Rh, Ag, Au, Fe, Co, Cr, Ni, Mn, Cu, Li, Mg, Ba Mo, Ru, Os, Ir, or combinations of these. Some examples of catalyst metals, although this list is not all inclusive, are V, Co, Cu, Ni or Fe oxides, for $NO_x$ and $SO_x$ conversion, noble metals and Cu, Zn, Co, Ni, Mn, Cr, Fe, for a variety of chemical reactions, etc.

One catalyst metal that is especially useful is platinum. When platinum is used, it is preferably combined with the carbon precursor in the form of a complex ammonium salt precursor such as ammonium chloroplatinate, $(NH_4)_2PtCl_4$.

By carbon precursor is meant a carbon-containing substance that converts to continuous structure carbon on heating. The carbon precursor can include any liquid or liquefiable carbonaceous substance. Examples of useful carbon precursors include thermoplastic resins (e.g., polyvinylidene, polyvinyl chloride, polyvinyl alcohol, and the like), sugar solutions, furfuryl alcohol and coal tar pitch.

Low viscosity carbon precursors (e.g., thermoset resins) are preferred especially when the precursor and catalyst are to be contacted with a substrate because their low viscosity allows greater penetration of the carbon precursor into the porosity of the substrate. Phenolic resins are most preferred due to their low viscosity, high carbon yield, high degree of cross-linking upon curing relative to other precursors, and low cost. Some phenolic resins that are especially suited are phenolic resole (No. 43290) and plyophen, both supplied by Occidental Chemical Co., Niagara Falls, N.Y.

The carbon precursor liquid used in the present method can include a single precursor material or a mixture of two or more precursor materials.

The carbon precursor and the catalyst precursor are combined by mixing them together to form a solution, or emulsion.

Once the carbon precursor and catalyst precursor are combined, they can be processed to carbonize the precursor and activate the carbon, to activate the catalyst if necessary, and to put the activated carbon in the desired physical form.

In accordance with a preferred embodiment, the carbon precursor and catalyst are contacted with a suitable inorganic porous monolith substrate to coat the substrate with the precursor and catalyst.

The substrate has an outer surface from which pores extend into the substrate. The coating penetrates into and is distributed throughout these pores as a coating thereon.

In its most useful form the monolithic substrate has means for passage of a workstream therethrough, e.g., a network of pores communicating from the outside to the inside, and/or thru channels extending from one end of the monolith to the other for passage of the workstream into one end and out through the other end.

The substrate must have enough strength to function in the application and be capable of withstanding the heat-treating temperatures experienced in forming the activated carbon coating. It is desirable that the overall open porosity of the substrate be at least about 10%, preferably greater than about 25% and most preferably greater than about 40%. For most purposes, the desirable range of porosity is about 45% to about 55%. Preferably the pores of the substrate material create "interconnecting porosity" which is characterized by pores which connect into and/or intersect other pores to create a tortuous network of porosity within the substrate.

Suitable porous substrate materials include ceramic, glass ceramic, glass, metal, and combinations thereof. By combinations is meant physical or chemical combinations, e.g., mixtures, compounds, or composites.

Some materials that are especially suited to the practice of the present invention, although it is to be understood that the invention is not limited to such, are those made of cordierite, mullite, clay, talc, zircon, zirconia, zirconates, zirconia-spinel, magnesium alumino-silicates, spinel, alumina, silica, silicates, borides, alumino-silicates, e.g., porcelains, lithium aluminosilicates, alumina silica, feldspar, titania, fused silica, nitrides, borides, carbides, e.g., silicon carbide, silicon nitride or mixtures of these. Cordierite is preferred because its coefficient of thermal expansion is comparable to that of carbon, increasing the stability of the activated carbon body. Some typical ceramic substrates are disclosed in U.S. Pat. Nos. 4,127,691 and 3,885,977. Those patents are herein incorporated by reference as filed. Suitable metallic materials are any metal or alloy or intermetallic compound that provides durable structural service, and desirable one that does not soften below about 600° C. Particularly useful are alloys which are predominately of iron group metal (i.e. Fe, Ni, and Co), either with carbon (e.g. steels. especially stainless or high temperature steels) or without carbon. Most typical of the latter alloys for higher temperature service are those consisting essentially of iron group metal and aluminum, with the preferred iron group metal being iron. Especially preferred is Fe, Al, and Cr. For example, Fe5-20Al-5-40Cr, and Fe710Al10-20Cr powders with other possible additions are especially suited. Some typical compositions of metal powders for forming substrates are disclosed in U.S. Pat. Nos. 4,992,233, 4,758,272, and EPO Patent Application Publication No. 488716A1 which are herein incorporated by reference as filed. U.S. Pat. Nos. 4,992,233 and 4,758,272 relate to methods of producing porous sintered bodies made from metal powder compositions of Fe and Al with optional additions of Sn, Cu, and Cr. European Patent Application Publication No. 488716A1 relates to porous sintered bodies having a composition consisting essentially of in percent by weight about 5 to 40 Cr, about 2 to 30 Al, 0 to about of special metal, 0 to about 4 of rare earth oxide additive and the balance being iron group metal and unavoidable impurities, with the preferred iron group metal being iron. When rare earth oxide is present, the special metal is at least one of Y, lanthanides, Zr, Hf, Ti, Si, alkaline earth metal, B, Cu, and Sn. When no rare earth oxide is present, the special metal is at least one of Y, lanthanides, Zr, Hf, Ti, Si, and B, with optional additions of alkaline earths, Cu, and Sn.

The substrate is preferably a honeycomb or matrix of thin walls forming a multiplicity of open ended cells extending between the ends of the honeycomb.

Some examples of honeycombs produced by the process of the present invention, although it is to be understood that the invention is not limited to these, are those having about 172 cells/cm$^2$ (1100 cells/in$^2$ (cpsi)), about 94 cells/cm$^2$ (600 cells/in$^2$), about 62 cells/cm$^2$ (400 cells/in$^2$), or about 47 cells/cm$^2$ (300 cells/in$^2$), those having about 31 cells/cm$^2$ (200 cells/in$^2$), or about 15 cells/cm$^2$ (100 cells/in$^2$), or about 2.5 cells/cm$^2$, (16 cells/in$^2$) or about 1.5 cells/cm$^2$ (9 cells/in$^2$).

Wall (web) thicknesses range typically from about 0.1 to about 1.3 mm (about 4 to about 50 mils) for most applications and it is to be understood that the invention is not limited to these dimensions. The external size and shape of the body is controlled by the application and is not limited to those described above. For example, other combinations of cell densities and wall thicknesses can be made.

Cordierite honeycombs are especially preferred as substrates for the activated carbon.

The contacting is done by any method suitable to bring the carbon precursor and catalyst material in intimate contact with the inorganic substrate. Exemplary methods of contacting include dipping the substrate in the carbon precursor/catalyst solution (or liquid) or spraying the carbon precursor/catalyst precursor solution (or liquid) directly on the substrate.

The eventual quantity of carbon (and catalyst also) formed on the substrate is dependent on the amount of carbon precursor (and catalyst precursor) retained by the substrate. The amount of carbon precursor (and catalyst) retained by the substrate can be increased e.g., by contacting the substrate with the carbon precursor (and catalyst) more than once and allowing the substrate to dry between contacting steps. In addition, the amount of carbon precursor (and catalyst) retained by the substrate can be controlled in porous substrates by simply modifying the overall porosity of the substrate (e.g., increasing porosity will increase the amount of precursor (and catalyst) retained by the substrate and in turn the amount of carbon (and catalyst metal) formed thereon).

The substrate and carbon precursor (and catalyst) are then subjected to heat-treatments to convert the carbon precursor to continuous carbon (carbonize). The resulting carbon (and catalyst)-coated substrate is then heat-treated to activate the carbon and produce an activated carbon structure having the catalyst dispersed thereon.

When the carbon precursor is a thermosetting resin, the carbon precursor is cured prior to activation and most typically prior to carbonization. The curing is accomplished typically by heating the coated substrate to temperatures of about 100° C. to about 200° C. for about 0.5 to about 5.0 hours. Curing is generally performed in air at atmospheric pressures. When using certain precursors, (e.g., furfuryl alcohol) curing can be accomplished by adding a curing catalyst such as an acid catalyst at room temperature.

Carbonization is the thermal decomposition of the carbonaceous material, thereby eliminating low molecular weight species (e.g., carbon dioxide, water, etc.) and producing a fixed carbon mass and a rudimentary pore structure in the carbon.

Such conversion or carbonization of the cured carbon precursor is accomplished typically by heating the substrate to a temperature in the range of about 600° C. to about 1000° C. for about 1 to about 10 hours in a reducing or inert atmosphere (e.g., nitrogen, argon, etc.).

Curing and carbonizing the carbon precursor on the substrate results in a structure having a coating extending over the entire surface of the substrate in the form of a substantially uninterrupted layer of carbon with catalyst dispersed thereon. This carbon coating is anchored into the porosity of the substrate and as a result is highly adherent. The top surface of the carbon coating is an uninterrupted layer of carbon to carbon bonds.

As discussed above, if interconnecting porosity is present in the substrate, an interlocking network of carbon will be formed within the composition, resulting in an even more adherent carbon coating. The coating of uninterrupted carbon extending over the outer surface of the substrate formed provides a structure with advantages of high adsorptive capability despite a relatively low carbon content, high strength, and high use temperatures. Structures can be formed which contain carbon in an amount less than and up to about 50% often less than and up to about 30% of the total weight of the substrate and carbon.

The activating is done to substantially enhance the volume and to enlarge the diameter of the micropores formed during carbonization, as well as to create new porosity. Activation creates a high surface area and in turn imparts high adsorptive capability to the structure. Activation is done by known methods such as exposing the structure to an oxidizing agent such as steam, carbon dioxide, metal chloride (e.g., zinc chloride), phosphoric acid, or potassium sulfide, at high temperatures (e.g., about 600° C. to about 1000° C.).

The activated carbon coating of the above-described activated carbon structure is highly resistant to chipping and flaking, exhibits high strength and is highly resistant to high temperatures in comparison with carbon coatings produced by dipping a substrate in a slurry of activated carbon and binder. In addition, these carbon-coated structures exhibit adsorptive capabilities higher than extruded carbon structures or coated substrates where the coating is made directly from carbon.

An alternative embodiment for forming the activated carbon supported catalyst is to process the carbon precursor and catalyst precursor to form a powder, pellets, granules, or a monolithic body. In this case the carbon is not supported on a porous inorganic substrate. However the processing of the carbon supported catalyst parallels that of the activated carbon coated substrates. For example, the catalyst precursor is mixed with the carbon precursor in a quantity sufficient to provide a specific metal catalyst loading (typically about 0.1 to 10 wt. %). The carbon precursor is then subjected to a series of heat treatments to cure the carbon precursor if necessary and thereafter convert the carbon precursor to continuous carbon, by carbonization. The form of the activated carbon/catalyst as a powder, pellets, granules or monolithic body is developed in the curing or carbonization steps. Powders can be made by grinding cured or carbonized product, or by spray drying the solution of precursors at a temperature at which curing of the carbon precursor is accomplished (if curing is to be done). Subsequently the powder is carbonized and activated to form highly porous activated carbon. Monoliths can be formed by casting the carbon and catalyst precursors into a form and carefully curing, carbonizing, and activating the form. Pellets and granules can be formed from monoliths by grinding, or by casting the precursor solution/emulsion into small shapes.

The carbonized catalyst in the carbon material is activated by one of the aforementioned processes to achieve a high surface area in the carbon and to expose the catalyst metal surfaces to fluids for reactions.

The embodiment of a catalyst supported on activated carbon powders, granules, pellets or monolithic carbon bodies offers many of the advantages of activated carbon coated substrates, namely, high catalyst dispersion, high adsorption capacity, high pore volume, and high active surface area. Particularly advantageous and differentiating from other methods used to form catalysts on activated carbon forms is the process used to achieve material attributes wherein highly dispersed catalysts are achieved in a single series of process steps. Other methods such as incipient wetness techniques or vapor phase deposition require careful attention to carbon surface chemistry and multiple applications of catalyst and are therefore exceedingly costly.

In one especially useful embodiment, resin such as phenolic resin is combined with platinum in the form of a platinum salt such as e.g., $(NH_4)_2PtCl_4$ at a loading of e.g., about 0.5% to 5% by weight of Pt metal based on the amount of carbon after activating, and applied to a substrate such as e.g. a cordierite honeycomb. It has been found that the size of the platinum crystallites and degree of dispersion of the platinum on the activated carbon can be controlled by controlling the carbonization and activation temperature as will be seen in the examples that follow.

In another useful embodiment, transition metals, e.g. Fe, Cu, Ni, and Cr in the form of soluble salts as chlorides can be combined with a carbon precursor, e.g., phenolic resin and applied as a coating to a substrate, e.g. a cordierite honeycomb.

Different metal precursors convert to metals or metal oxides during the carbonization and activation steps according to their thermodynamic equilibrium under the conditions of firing. In the reducing environment of carbonization, only metals with strong oxidation potentials, such Cr form oxides while metals with weak oxidation potentials form as the metal. Under the mild oxidation conditions of activation, metals with moderate oxidation potential such as Fe, and to a lesser extent Ni, form oxides while the weak oxidation potential metals such as Pt, and Cu form metal crystallites. This invention is not limited to those catalysts that form directly during carbonization and activation steps. The oxidation state, and indeed the chemical state of the metal catalysts can be altered by appropriate treatments after the activation step is complete. Metal oxides can be reduced in hydrogen containing environments by thermal treatment without any compromise of the activated carbon structure. Metals can be converted to oxides without substantially oxidizing the carbon support by exposure to air at less than about 400° C. And where a different chemical form the catalyst is required, a sulfide for example, heat treatment in a $H_2S$ containing atmosphere can be used to convert the metals of metal oxides to finely dispersed metal sulfide catalyst particles without significantly affecting the carbon structure.

Carbonization can be carried out in inert or reducing atmosphere at temperatures of about 500° C. to 1100° C. for about 1–10 hr. and preferably about 700° C. to 900° C. Activation can be carried out at temperatures of about 400° C. to 1000° C. and preferably about 400° C. to 900° C. Specific temperatures depend on the catalyst and precursors.

In accordance with another embodiment, the activated carbon and catalyst coated substrate can be fitted with electrodes. A preferred method of doing this is described in U.S. patent application Ser. No. 08/249,897, filed May 26, 1994, which is herein incorporated by reference as filed.

The preferred substrates are honeycombs, and most preferably cordierite honeycombs.

In this embodiment, advantage is taken of the conductive properties of carbon. With the passage of an electric current through the carbon, the carbon heats up to a predetermined temperature depending on the resistance of the body and the voltage applied. The body can be designed with resistance and voltage suitable for raising the temperature of the structure to the desired temperature.

Such bodies fitted with electrical contacts for heating to desired temperature and having uniformly dispersed catalyst coating on them can function as continuous reactors for appropriate reactions. For a chosen reaction, an activated carbon coated substrate is prepared with the desired catalyst dispersed on the activated carbon. With electrodes, such a body is heated to the optimum reaction temperature. The reactants are passed through this reactor to obtain the desired reaction, e.g., chemcial conversion.

The electrically conducting means are positioned so as to be able to conduct an electric current through the structure or more particularly, the carbon, to heat carbon uniformly. The actual positioning of the conducting means depends on the type of means and on the geometry of the structure and the invention is not limited to any specific type of conducting means or geometry as long as the current generates uniform heating of the structure without hot spots.

In general, the conducting means must provide a resistivity of at least about 0.001 ohm.cm, but typically at least about 0.01 ohms, and most typically at least about 0.10 ohm.cm. For most purposes of the present application, the resistivity is between about 0.10 ohm.cm and 25 ohm.cm.

For the purposes of the present invention resistivity of the body is defined by the formula:

$$\rho = \frac{R \cdot A}{L}$$

where $\rho$ is the resistivity in ohm.cm, R is the resistance in ohms, A is the area of a conducting surface in $cm^2$, and L is the distance between two conducting surfaces in cm.

The voltage and current requirement will vary depending on the application and the resistivity can be adjusted as desired according to the above equation. For example, if the body is to be heated in an oxygen containing atmosphere, such as air for automotive applications, the voltage and current should be such as to raise the temperature so that no hot spot in the body higher than about 350° C. If the body is to be heated in an inert or non-reacting atmosphere, e.g., $N_2$, the voltage and current should be such as to raise the temperature so that no spot in the body is higher than about 1000° C.

Some especially preferred conducting materials are metals as copper, silver, aluminum, zinc, nickel, lead, tin, and their alloys, with the preferred being copper because of its high conductivity which minimizes resistance, and because it is inexpensive.

The conducting means is typically either in the form of a strip of the conducting material or electrode or a coating of conductive material on the monolith structure. In this invention, the term "conductive coating" refers to the coating which is applied to the activated carbon structure and is thereby differentiated from the carbon coating in carbon coated structures.

If an electrode is used, it can be applied by pressure contact e.g., a spring. Or a strip of conducting metal can be used and be attached to the structure by an electrically conducting adhesive such as e.g., silver-containing epoxies such as E-solder #3012 and #3021 from Acme Chemicals and Insulation Co.

A conductive coating is cost effective and gives a uniform resistance path so as to avoid hot spots.

One especially suitable geometry is having the conducting metal applied to opposing surfaces of the body. By opposing surfaces is meant surfaces that are so spaced according to the geometry of the body that passage of current between the conductive surfaces produces a current that heats the carbon uniformly.

A preferred shape of the monolith is a honeycomb e.g., a carbon coated honeycomb from a carbon precursor, of rectangular shape with the conductive coating on two opposite faces.

The conductive coatings extend inside the monolith structure and cover the cell walls down a portion of the length of the walls. The length covered by the coating can vary but must be sufficient to distribute current uniformly across the body.

Other possible body shapes and coating configurations are rectangular faced or cylindrical honeycombs having the conductive coating in the form of stripes along the closed sides, or ringed around sides at the open ends, or on the open ends, or completely on the outside of the structure with another contact being made to the inside of the structure e.g., at the center. The above are only illustrative and are not meant to be limiting. Such will depend on the nature of the application and factors such as e.g., cost, space, temperature, etc. The requirement is that a low resistance, mechanically stable system is achieved.

The conductive coating can be applied by any known suitable technique such as frit bonding, arc spraying, flame spraying, plasma spraying, ultrasonic soldering, painting, etc.

The invention is not limited to any specific thickness of the coating. Thickness depends on the nature of the coated surface and the coating metal. The coating must be thick enough to provide a good low resistance current path, and to last, that is be resistant to oxidation and corrosion and to have good mechanical stability. However the coating should not be so thick as to chip or flake off or be prohibitively expensive.

One especially suitable conductive coating technique involves first ensuring that the activated carbon coated surface is smooth. This is usually done by grinding the activated carbon coated surface until flat and smooth. If the surface is rough it is ground on a 600 grit sandpaper. The conductive coating is then applied over the smooth activated carbon coating. Some useful techniques for applying the conductive coating are described below.

One technique is by forming a coating mixture of copper metal powder and glass frit, with a typical copper to frit weight ratio of about 10:1 to 2:1, and more typically about 6:1 to 2:1. For example some typical copper-frit compositions are 70 wt. % Cu and 30 wt. % frit or 84% copper and 16 frit %. The coating is then fired.

Arc spraying is a suitable technique. Arc spraying is done by passing two metallizing wires through a wire feeder and an arc spray gun. Electric current creates an arc between the wires. A high heat zone is created by the arc which melts the wires, and compressed air blows molten metal onto the substrate to be coated resulting in the deposition of a durable coating.

Another technique is to provide a solder, e.g., of silver, nickel, or other suitable conductive coating and applying it by the methods described above including ultrasonic soldering.

To more fully illustrate the invention, the following non-limiting examples are presented. All parts, portions, and percentages are on a weight basis unless otherwise stated.

EXAMPLE 1

A platinum salt $(NH_4)_2PtCl_4$ from Englehard specialty chemicals Newark, N.J. was dissolved in deionized water to form a 33% solution. The phenolic resin was phenolic resole (No. 43290) from Occidental Chemical Co., Niagara Falls, N.Y. Platinum salt solution, about 7.5 g, was added to about 100 g of resin and mixed. The mixture was then coated onto a 62 cells/cm² (400 cells/in²) porous cordierite honeycomb substrate by dipping for about 1 minute, followed by clearing the excess resin from the channels by blowing with compressed air. Samples were heated from room temperature to about 150° C. at about 25° C./hr to dry and cure the resin. The cured resin coated honeycomb was then heated in $N_2$ to about 500° C. at about 150° C./hr and held at that temperature for about 1 hour. The honeycomb was then taken to about 900° C. and held for about 6 hours to carbonize the resin. The carbonized resin coated honeycomb was then activated in steam at about 800° C. for about 1 hour with about 30 mole fraction of steam in nitrogen. The sample thus activated was cooled to room temperature, removed and characterized by $H_2$ temperature programmed reduction (TPR), and desorption (TPD) method, and x-ray diffraction method. The TPD results indicate the Pt crystallites are about 100 Å. The x-ray diffraction pattern indicates the Pt crystallites with little or no PtO or $PtO_2$. Such well dispersed Pt is expected to make a highly active catalyst for various chemical reactions.

Temperature programmed reduction (TPR) and temperature programmed desorption (TPD) are well known techniques used to measure catalyst dispersion. The carbon sample containing the catalyst is first heated in argon to about 300° C. at a flow rate of about 30 cc/min. to remove any adsorbed species. The sample is then heated to about 380° C. in a flow of $H_2$ (30 cc/min) to reduce the metals. The sample is then cooled to room temperature and $H_2$ passed over it for adsorption. The adsorbed hydrogen is desorbed by heating the sample and the amount of hydrogen evolved at different temperatures is measured. From the known amount of hydrogen, the active surface area of platinum metal is calculated and from the surface area and the known amount of catalyst present in the sample, dispersion (i.e. the size of platinum crystallites is obtained). This is a standard technique and the dispersion sites are verified via transmission electron microscopy (TEM) techniques. The average size of crystallites calculated from the TPD experiment correlates well with the size of crystallites measured by TEM. TEM is an electron microscopic technique that permits visualization of features at magnifications of over 1 million, thereby allowing direct measurement of dispersed particles.

EXAMPLE 2

The procedure of Example 1 was repeated but the activation was carried out in $CO_2$ at about 900° C. for about 2 hours. The TPD results indicate the Pt crystallites are about 170 Å. The x-ray diffraction pattern indicates the presence of Pt crystallites having little or no PtO or $PtO_2$ which is desirable because platinum is useful in the metallic form and not as oxides. The results show that platinum is present in the metallic form or the form most useful as a catalyst.

EXAMPLE 3

The experiment of Example 2 was repeated but the activation of carbon was carried out at about 700° C. for 2 hours in $CO_2$. The size of the platinum crystallites on this sample was about 25 Å. This dispersion is thus significantly higher than in example 1 or 2.

The examples above clearly illustrate that the platinum dispersion can be controlled via the processing parameters for carbon. The very high dispersion attained in Example 3 is close to the state of the art catalysts prepared by incipient method at 20 angstroms.

EXAMPLE 4

Iron, nickel, copper, and chromium chlorides were each dissolved in water to yield solutions of about 2 parts of the respective metal to 5–10 parts of water. The metal chloride solution was mixed with a volume of phenolic resin sufficient to generate about 98 parts of activated carbon. The resulting mixture of metal chloride and resin was cured at about 150° C. and carbonized at about 700° C. to about 900° C. The samples were activated at about 900° C. in $CO_2$ for about 1 hour. Carbonized resins with Fe, Ni, and Cu salts were found by X-ray diffraction to support the metals in the zero valent state (no metal salts or compounds formed during the carbonization process). Chromium formed a $Cr_2O_3$ phase in the carbon with no zero-valent metal. The 900° C. carbonized samples were activated for about 1.5 hours at about 900° C., and examined by x-ray diffraction. Chromium and iron formed oxides, and nickel was present as a combination of NiO and Ni metal. Copper was present as the metal only. These results show that the chemical state of the metal in activated carbon is dependent on processing and can therefore be controlled and predicted. In other words, by choosing the appropriate catalyst precursor and process conditions the catalyst formed in the metallic or oxidized state.

One of the many uses for the bodies of the present invention is in ozone remediation. Ozone generated during the operation of laser printers and photocopiers has been found in large enough concentrations in office environments to be considered a health hazard. Activated carbon beds have been used in the past to adsorb the ozone, decompose it and release the oxygen formed to the environment. A problem created by the usage of the activated carbon bed is that the fan required to cool the internal operating parts of the printers and copiers has to overcome a large pressure drop to generate sufficient flow to cool. A solution to this problem is to use activated carbon in the form of a honeycomb. The disadvantages of formed activated carbon bodies were discussed previously. The bodies of the present invention perform very well in the ozone remediation application.

The following examples shows that the catalyzed carbon coated honeycombs of the present invention work well in ozone remediation.

EXAMPLE 5

A cordierite honeycomb with about 31 cells/cm$^2$ (200 cells/in$^2$) and 0.3 mm (12 mil) and square cell geometry was coated with plyophen phenolic resin from Occidental Chemical Corporation, Niagara Falls, N.Y. The resin was then cured and carbonized in nitrogen at about 900° C. and activated in $CO_2$ at the same temperature. The resulting carbon had a $N_2$ BET surface area of about 753 m$^2$/g. A 2.54 cm(1") diameter and 2.54 cm (1") long sample of honeycomb was then tested for ozone adsorption at an air velocity of about (15.24 meters (50 feet) per minute with about 0.60 ppm of ozone. The sample showed an adsorption efficiency of about 92%. The carbon percent on the sample was 21 wt. % based on the honeycomb.

EXAMPLE 6

Another cordierite sample with about 59 cells/cm$^2$ (380 cells/in$^2$) and triangular cell geometry was coated, cured, carbonized and activated as in Example 5. This sample was subjected to the ozone adsorption test at an air flow of about 50 (fpm) and ozone concentration of about 0.63 ppm. The adsorption efficiency was about 86% in this case. The carbon percent on the sample was about 19.8%.

The high adsorption efficiencies attained in both the above examples show the effectiveness of this product even at very low levels of carbon on the samples. Typically catalysts are deposited on the carbon coated honeycombs to increase their adsorption efficiency and lifetime.

The following examples describe depositing several transition metal oxide catalysts on honeycombs via the in-situ process of the present invention.

EXAMPLE 7

About 5.6 g of $Mn(NO_3)_2.4H_2O$ was dissolved in about 30 g of distilled water. This solution was then added to about 187.5 g of plyophen phenolic resin. A cordierite honeycomb was then coated with this resin solution. The resin was cured and carbonized at about 900° C. in nitrogen and activated at about 900° C. for about two hours to obtain an in-situ catalyst deposited honeycomb. The cordierite sample was a 62 cells/cm$^2$) (400 cpsi) honeycomb having a 0.15 mm (6 mil) wall. Ozone testing was done at about 1 wt ppm ozone in air at a testing velocity of about 120 feet/min. or about 36 meters/min. The ozone remediation efficiency was 100%.

EXAMPLE 8

The procedure of Example 7 was repeated with a solution of about 8 g $CuSO_4$ dissolved in about 35 g of water. The solution was then added to about 250 g of phenolic resin solution as in Example 7. A 62 cells/cm$^2$ (400 cpsi) honeycomb was coated with resin and then cured, carbonized, and activated as before to obtain a CuO deposited honeycomb. Under the same testing conditions as in Example 7, the ozone remediation efficiency was 100%.

EXAMPLE 9

The procedure of Example 8 was repeated with $MnSO_4$ instead of $CuSO_4$ to obtain a MnO deposit on the honeycomb. Under the same testing conditions as in Example 7, the ozone remediation efficiency was 100%.

EXAMPLE 10

A solution of about 8.8 g of $Fe(NO_3)_3.9H_2O$ and about 5.6 g of $Mn(NO_3)_2.4H_2O$ was added to about 187.5 g of plyophen phenolic resin. A cordierite honeycomb was then coated with this solution and cured and carbonized, and activated as before at about 900° C. Under the same testing conditions as in Example 7, the ozone remediation efficiency was 100%.

EXAMPLE 11

Some applications of the catalysts made according to this invention may require the carbon to be provided in a powder, granule, pellet or monolithic body. The following example illustrates a process for making a nickel catalyst supported on carbon powder.

Samples of nickel supported on activated carbon powder were made by the general method described in the previous examples. In the following examples about 1.85 g of $NiCl_2.6H_2O$ were dissolved in about 5 ml $H_2O$, and then added to about 100 ml of Plyophen phenolic resin. The samples were cured at about 150° C., and carbonized at about 600° C. to 800° C. The samples were further activated with $CO_2$ at about 700° C. to 900° C. Each of the samples was made as a granular powder, by grinding the cured resin to −100 mesh prior to carbonization.

One portion of the cured resin was carbonized at about 900° C. for about 6 hours, and examined in TEM. The average particle size of the nickel from the micrographs was 500 Å. X-ray diffraction analysis indicated that the nickel was present as nickel metal.

A second sample of the Ni/cured resin was carbonized to about 700° C. for about 6 hours. This sample had an average particle size of about 250–350 Å and also resulted in a substantially crystallized carbon support. The particle size of the nickel decreased as the carbonization and activation processes became milder, which indicates that the particle size can be controlled by optimizing the thermal processing of the material.

A third sample was carbonized at about 600° C. for about 2 hours and activated at about 800° C. for about 1 hour to yield a carbon with about 2.02% Ni. This sample was analyzed by TPD, which indicated that the average particle size was about 125 Å.

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. A method of making an activated carbon supported catalyst, the method comprising:
   a) combining a liquid thermosetting resin carbon precursor and a catalyst precursor wherein the catalyst precursor is in a soluble form;
   b) curing the thermosetting resin;
   c) carbonizing the thermosetting resin; and
   d) activating the carbon to produce an activated carbon supported catalyst.

2. A method of claim 1 wherein the catalyst precursor is a compound of a metal selected from the group consisting of transition metals, alkali metals, alkaline earth metals, and combinations thereof.

3. A method of claim 2 wherein the catalyst metal is selected from the group consisting of Pt, Pd, Rh, Ag, Au, Fe, Co, Cr, Ni, Mn, Cu, Li, Mg, Ba, and combinations thereof.

4. A method of claim 3 wherein the catalyst metal is platinum.

5. A method of claim 4 wherein the catalyst metal precursor is ammonium chloroplatinate.

6. A method of claim 1 wherein after the combining step, the thermosetting resin and catalyst precursor are applied as a coating on an inorganic substrate.

7. A method of claim 1 wherein the thermosetting resin is a phenolic resin.

8. A method of claim 6 wherein the substrate is a honeycomb.

9. A method of claim 6 wherein the inorganic substrate is selected from the group consisting of ceramic, glass, glass ceramic, metal, and combinations thereof.

10. A method of claim 9 wherein the inorganic substrate is made of cordierite.

11. A method of claim 1 wherein after the curing step, the thermosetting resin and catalyst precursor are ground to a powder.

12. A method of claim 1 wherein after the combining step the carbon precursor and catalyst precursor are shaped into a monolithic body.

13. An activated carbon supported catalyst produced by the method of claim 1.

14. An activated carbon supported catalyst produced by the method of claim 9.

15. An activated carbon supported catalyst produced by the method of claim 10.

16. An activated carbon supported catalyst of claim 15 wherein the substrate is a honeycomb.

17. An activated carbon supported catalyst of claim 16 having electrodes fitted thereon for conducting an electric current therethrough.

18. A method of claim 1 wherein the thermosetting resin is phenolic resin and the catalyst precursor is a platinum salt, the platinum salt being present in an amount sufficient to result in about 0.5% to 5% by weight Pt based on the amount of carbon after activating.

19. A method of claim 1 wherein the thermosetting resin is phenolic resin and the catalyst precursor is a platinum salt, and the resin and catalyst precursor are combined with a substrate, wherein after the curing step, the substrate with the resin and platinum salt are heated to carbonize the resin, and thereafter the carbon is activated carbon by being heated under conditions selected from the group consisting of (1) about 800° C. in steam for about 1 hour, (2) about 900° C. in $CO_2$ for about 2 hours, and (3) about 700° C. in $CO_2$ for about 2 hours to produce an activated carbon coated substrate having platinum homogeneously dispersed thereon substantially in the form of platinum metal.

20. A method of claim 1 wherein the catalyst precursor is selected from the group consisting of iron chloride, copper chloride, nickel chloride, and chromium chloride, and the carbon precursor is phenolic resin.

21. An activated carbon supported catalyst produced by the method of claim 19.

22. A method for carrying out a reaction, said method comprising:
   a) providing the activated carbon supported catalyst of claim 19 as a reactor;
   b) raising the temperature of the reactor; and
   c) passing reactants through the reactor to react the reactants at said temperature.

* * * * *